United States Patent [19]
Okumura et al.

[11] Patent Number: 5,546,185
[45] Date of Patent: Aug. 13, 1996

[54] ANGLE DETECTING APPARATUS FOR DETECTING ANGLE OF INCLINATION OF SCANNING MIRROR PROVIDED ON MICHELSON INTERFEROMETER

[75] Inventors: Eisuke Okumura, Kawasaki; Katsuhiko Tsuno, Yokohama, both of Japan

[73] Assignee: Kabushiki Kaisha Toshiba, Kawasaki, Japan

[21] Appl. No.: 311,323

[22] Filed: Sep. 23, 1994

[51] Int. Cl.⁶ .................................. G01B 9/02
[52] U.S. Cl. .................. 356/345; 356/346; 356/358
[58] Field of Search .................. 356/358, 345, 356/346

[56] References Cited

U.S. PATENT DOCUMENTS

| | | | |
|---|---|---|---|
| 4,053,231 | 10/1977 | Fletcher et al. | 356/363 |
| 5,133,598 | 7/1992 | Badeau | 356/346 |

FOREIGN PATENT DOCUMENTS

WO84/01211  3/1984  WIPO .

OTHER PUBLICATIONS

Bliznyuk et al, "Automatic Photoheterodyne Interferometric System for Control of Optical Details", Sep. 87, Measurement techniques, pp. 870–873.
Patent Abstracts of Japan, vol. 9, No. 161, (P–370) (1884), Jul. 5, 1985, JP–A–60–038625, Feb. 28, 1985, Katsu Inoue.

Primary Examiner—Frank Gonzalez
Assistant Examiner—Robert Kim
Attorney, Agent, or Firm—Oblon, Spivak, McClelland, Maier & Neustadt, P.C.

[57] ABSTRACT

A laser beam from a laser beam oscillator is guided to an incidence light path of a beam splitter of a Michelson interferometer by means of a first guide mirror, reflected by a fixed mirror and a scanning mirror of the Michelson interferometer, and returned to the beam splitter, thus obtaining an interference light beam. The interference laser beam is guided to first and second laser beam detectors by means of a second guide mirror to detect variations in intensity of the interference laser beam. On the basis of the variations in intensity of the interference laser beam, an angle of inclination ($\theta$) of the scanning mirror is measured.

7 Claims, 4 Drawing Sheets

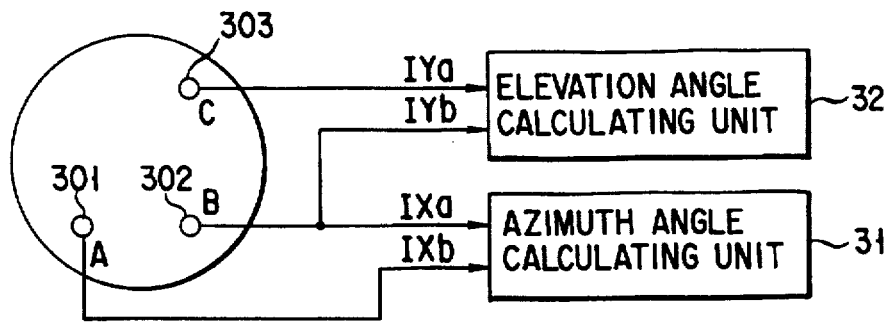
F I G. 5
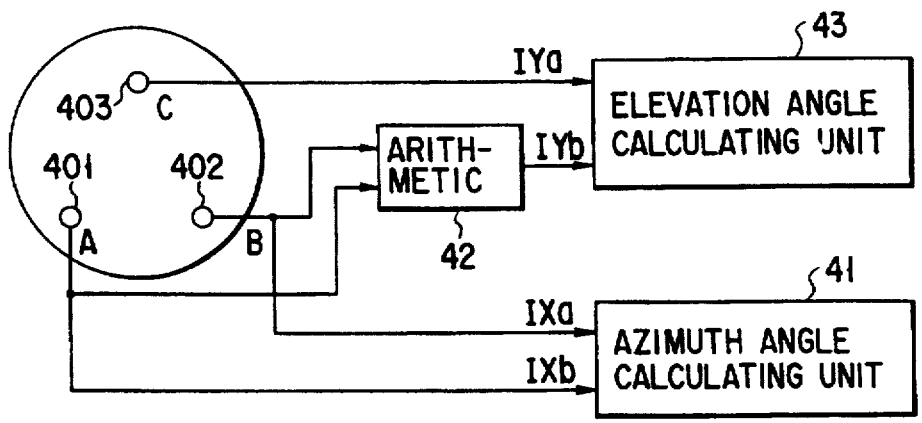
F I G. 6
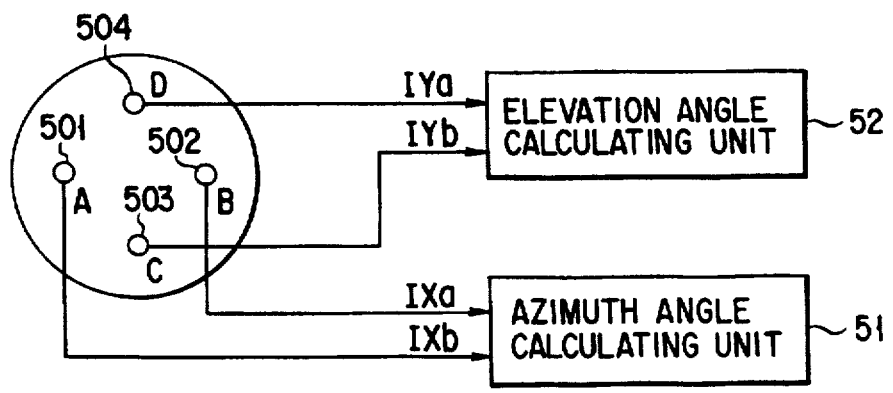
F I G. 7

ANGLE DETECTING APPARATUS FOR DETECTING ANGLE OF INCLINATION OF SCANNING MIRROR PROVIDED ON MICHELSON INTERFEROMETER

BACKGROUND OF THE INVENTION

1. Field of the Invention

The present invention relates generally to a Michelson interferometer used in a Fourier-transform spectrometer for detecting a component of a gas from, for example, a radiation/absorption spectrum of a gas, and more particularly to an angle detecting apparatus for detecting the angle of inclination of a scanning mirror, which is moved along an optical axis thereof with respect to the optical axis.

2. Description of the Related Art

A Fourier-transform spectrometer using a Michelson interferometer has been known as an apparatus, mounted on a spacecraft such as an artificial satellite, for observing a spectrum of infrared radiation, etc. generated from the surface of the earth and the atmosphere. In the Michelson interferometer, it is necessary to situate a fixed mirror and a scanning mirror in a fixed positional relationship at a predetermined angle defined between both mirrors, as is well known. However, the angle of the scanning mirror, as compared to the fixed mirror the position of which is stationary, is easily variable with respect to the optical axis of the scanning mirror since the scanning mirror is moved for scanning along the optical axis. In consideration of this problem, a Michelson interferometer of the type in which retro-reflectors represented by corner cubes are adopted as a fixed mirror and a scanning mirror.

However, when the Michelson interferometer is used in a dark space such as the outer space, and delicately varying infrared radiation, etc. is detected, the caliber of the corner cube must be greatly increased to obtain a necessary quantity of light.

This problem is serious in the field of space development in which limitations to weight are very strict.

SUMMARY OF THE INVENTION

The object of the present invention is to provide an angle detecting apparatus for detecting precisely an angle of inclination of a scanning mirror of a Michelson interferometer for use in a spacecraft.

According to the present invention, there is provided an angle detecting apparatus for detecting an angle of inclination of a scanning mirror of a Michelson interferometer, the apparatus comprising: a fixed mirror situated on one of a transmission light path and a reflection light path of a beam splitter to which an incident light beam is guided; a scanning mirror situated on the other of the transmission light path and the reflection light path of the beam splitter so as to be movable along an optical axis of the scanning mirror, the incident light beam being guided to the scanning mirror; photodetector means for receiving an interference light beam emanating from the beam splitter, the interference light beam being produced such that the incident beam is guided via the beam splitter to the fixed mirror and the scanning mirror, reflected by the fixed mirror and the scanning mirror and returned to and interfered by the beam splitter, the photodetector means detecting a variation in intensity of the interference beam; signal processor means for calculating a wavelength of the incident light beam on the basis of the variation in light intensity detected by the photodetector; laser beam oscillation means for oscillating a laser beam; optical means for guiding the laser beam from the laser beam oscillation means to the light paths of the beam splitter and receiving an interference laser beam from the beam splitter; laser beam detector means for detecting variations in light intensity of the interference laser beam obtained by the optical means at at least two points in one of an azimuth direction and an elevation direction of the scanning mirror; and angle calculating means for calculating an angle of inclination of the scanning mirror in one of the azimuth direction and the elevation direction of the scanning mirror on the basis of the light intensities of the interference laser beam detected by the laser beam detector means at the at least two points.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 shows the structure of a part of another embodiment of the invention;

FIG. 6 shows the structure of a part of another embodiment of the invention; and FIG. 7 shows the structure of a part of another embodiment of the invention.

DETAILED DESCRIPTION OF THE PREFERRED EMBODIMENTS

Embodiments of the present invention will now be described with reference to the accompanying drawings.

Figure 1:
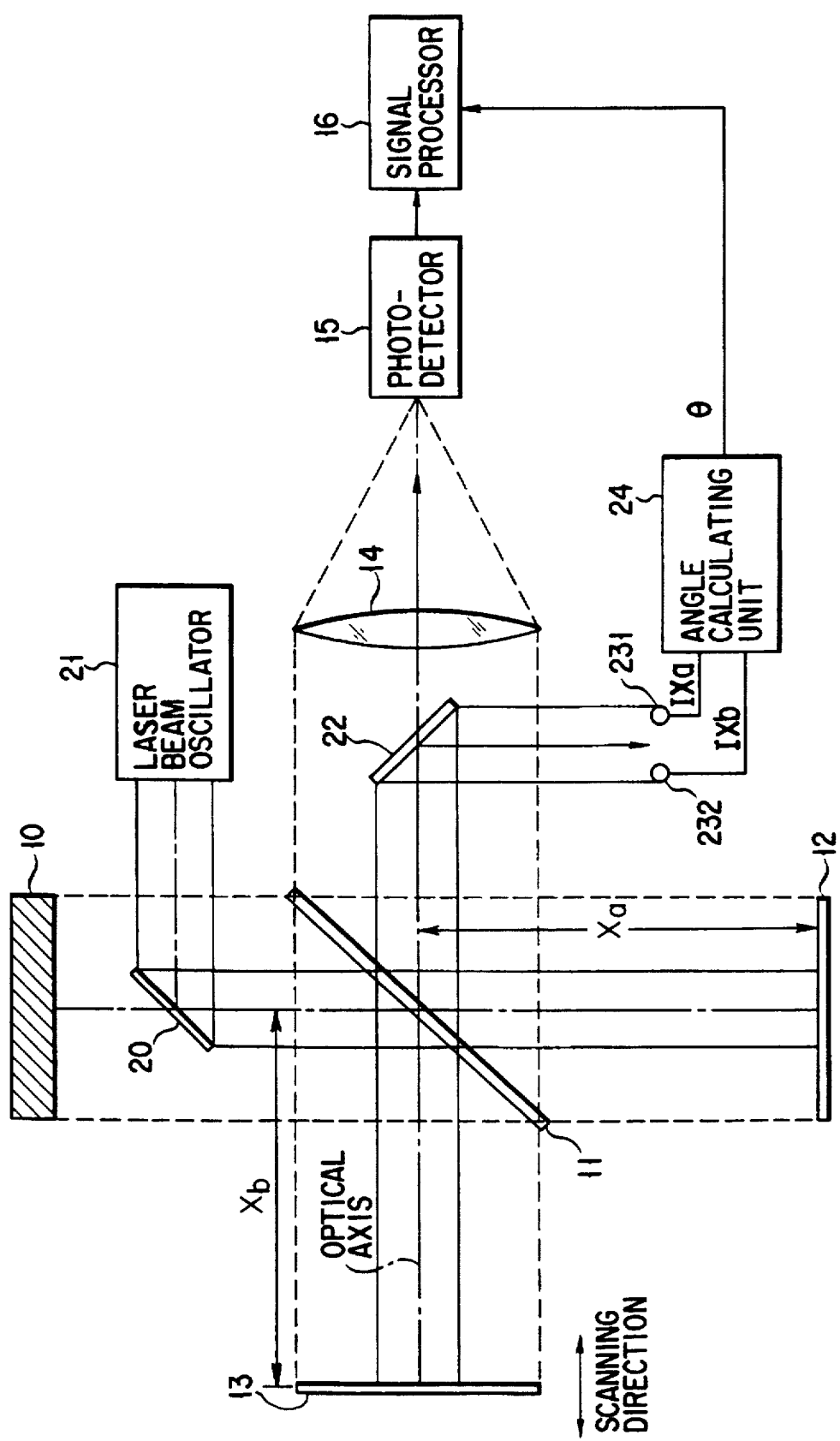
FIG. 1 shows schematically the structure of an angle detecting apparatus according to an embodiment of the present invention.

FIG. 1 shows an angle detecting apparatus according to an embodiment of the invention. Prior to a description of the embodiment, the wavelength detection principle of a Michelson interferometer applied to the present invention will first be described.

A beam radiated from an observation object 10 is made incident on a beam splitter 11 which is a part of the Michelson interferometer. A fixed mirror 12 and a scanning mirror 13 are disposed on a transmission beam path and a reflection beam path of the beam splitter 11. The scanning mirror 13 is moved for scanning at a fixed scanning speed v in the direction of the optical axis (indicated by a double-headed arrow).

The beam splitter 11 passes a part of the incident beam and guides it to the fixed mirror 12, and reflects the other part of the beam and guides it to the scanning mirror 13. The beams led to the fixed mirror 12 and scanning mirror 13 are reflected by the fixed mirror 12 and scanning mirror 13, respectively, and are guided to the beam splitter 11 once again. Parts of the beams from the fixed mirror 12 and scanning mirror 13 are reflected by and transmitted through the beam splitter 11, and then mixed and guided to a condensing lens 14.

The beams led to the condensing lens 14 interfere with each other in accordance with a distance Xa between the beam splitter 11 and the fixed mirror 12, a distance Xb between the beam splitter 11 and the scanning mirror 13, and the wavelengths of the beams. Although the distance Xa between the beam splitter 11 and the fixed mirror 12 is constant, the distance Xb between the beam splitter 11 and the scanning mirror 13 is variable. Thus, the intensity of light incident on the condensing lens 14 varies in accordance with the wavelength of the beam radiated from the observation object 10. If the wavelength of the radiated beam is $\lambda$, a variation I of intensity of light is given by $$I=\cos\{4\pi(Xa-Xb)\lambda I\} \quad (1)$$

wherein $\lambda I$ is the wavelength of radiation light (from object 10).

The light condensed by the condensing lens 14 is input to a photodetector 15. The photodetector 15 converts the incident light to an electric signal and outputs the electric signal to a signal processor 16. The signal processor 16 amplifies and records the data (I) expressed by formula (1). The recorded data (I) is Fourier-transformed, thereby detecting the wavelength of the radiated light from the observation object 10 and measuring the spectrum of light.

A description will now be given of an angle detecting apparatus for detecting the angle of inclination of the scanning mirror 1 provided on the Michelson interferometer according to the present invention.

Specifically, a first guide mirror 20 is disposed on an incident light path of the beam splitter 11, and a laser beam oscillator 21 is provided on an incident light path of the first guide mirror 20. A second guide mirror 22 is disposed between the beam splitter 11 and the condensing lens 14. A first laser beam detector 231 and a second laser beam detector 232 are disposed on a reflection beam path of the second guide mirror 22, for example, with a predetermined distance between the detectors 231 and 232 in a direction perpendicular to the optical axis of the Michelson interferometer. An angle calculating unit 24 is connected to output terminals of the first and second laser beam detectors 231 and 232. The angle calculating unit 16 is connected, for example, to the signal processor 16.

A laser beam oscillated and output from the laser beam oscillator 21 is made incident on the first guide mirror 20. The laser beam is guide to the incident light path of the beam splitter 11 by the first guide mirror 20. The beam splitter 11 passes a part of the incident laser beam through and guides it to the fixed mirror 12, and also the beam splitter 11 reflects the other part of the laser beam and guides it to the scanning mirror 13. The beam components guided to the fixed mirror 12 and scanning mirror 13 are reflected by the fixed mirror 12 and scanning mirror 13, respectively, and led to the beam splitter 11 once again, and then mixed and guided to the second guide mirror 22 as an interference laser beam. The interference laser beam guided to the second guide mirror 22 is made incident on the first and second laser beam detectors 231 and 232. The first and second laser beam detectors 231 and 232 convert the incident interference laser beam to electric signals and deliver the electric signals to the angle calculating unit 24.

The interference laser beam varies in accordance with a difference between the distances xa and Xb. Since the wavelength of the laser beam is already known, the difference between the distances Xa and Xb is found from variations IXa and IXb in intensity of the interference laser beam.

Figure 2:
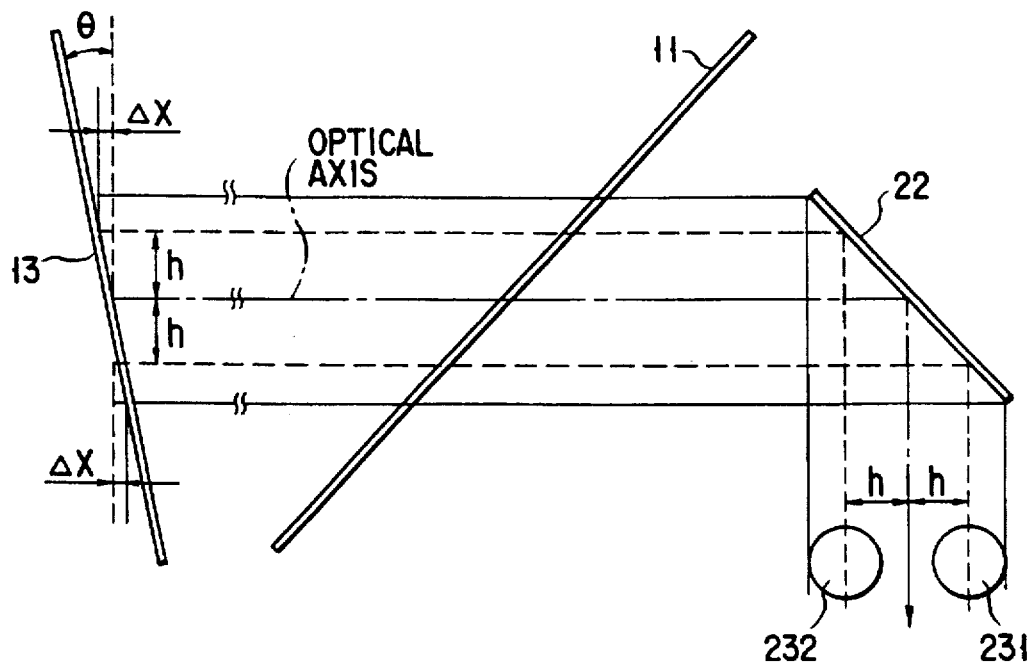
FIG. 2 illustrates the principle of operation of the angle detecting apparatus as shown in FIG. 1.

As is shown in FIG. 2, the first and second laser beam detectors 231 and 232 are juxtaposed, for example, at a distance 2h therebetween in the azimuth direction of the scanning mirror 13. If the scanning mirror 13 is inclined by an angle $\theta$ with respect to the optical axis in the azimuth direction, a distance Xb between a point of distance h from the optical axis of the scanning mirror 13 and the beam splitter 11 varies at a rate of $\Delta X=h\times\theta$. Accordingly, the first and second laser beam detectors 231 and 232 situated at the distance h from the optical axis deflected perpendicularly by the scanning mirror 13 detect variations Ixa and IXb in intensity of interference laser beam components represented by formulae (2) and (3):

$$IXa=\cos\{4\pi(Xa-Xb+\Delta X)\lambda\} \quad (2)$$

$$IXb=\cos\{4\pi(Xa-Xb-\Delta X)\lambda\} \quad (3)$$

where $\lambda$ is the wavelength of the laser beam.

The first and second laser beam detectors 231 and 232 deliver to the angle calculating unit 24 electric signals corresponding to the variations IXa and IXb in intensity of the interference laser beam components. Since the wavelength of the laser beam is already known, the angle calculating unit 24 calculates Xa–Xb and $\Delta X$ on the basis of IXa and IXb, as will be described below. Since the value $\Delta X$ is a product of h and $\theta$, as described above, the angle calculating unit 24 finds the angle $\theta$ of inclination in the azimuth direction of the scanning mirror 13 and outputs the value of the angle $\theta$ to the signal processor 16. On the basis of, for example, the input value of the angle $\theta$ of inclination, the signal processor 16 corrects the wavelength and light intensity of the radiation beam from the observation object 10, thus measuring the spectrum of light.

In the case where a He—Ne laser in which the wavelength $\lambda$ of the laser beam from laser beam oscillator 21 is 0.0633 micrometer is used and the obtained calculation results are h=10 mm and the length of $\Delta X$ is 1 wavelength, the calculation value of the angle $\theta$ is (4/1000) degree.

Figure 3:
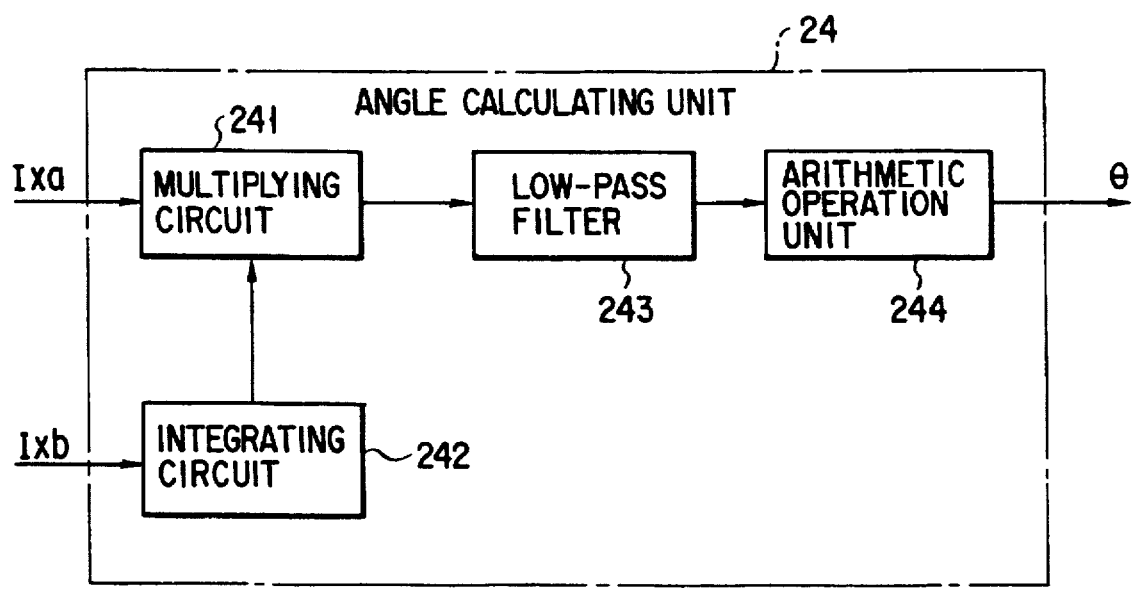
FIG. 3 is a block diagram showing in detail an angle calculating unit as shown in FIG. 1.

As is shown in FIG. 3, for example, the angle calculating unit 24 comprises a multiplying circuit 241, an integrating circuit 242, low-pass filter 243 and an arithmetic operation unit 244. Specifically, one input terminal of the multiplying circuit 241 is connected to an output terminal of the first laser beam detector 231. An input terminal of the integrating circuit 242 is connected to an output terminal of the second laser beam detector 232. An output terminal of the integrating circuit 242 is connected to the other input terminal of the multiplying circuit 241. The integrating circuit 242 integrates the variation IXb in intensity of the input interference laser beam, shifting the phase of the variation IXb by 90°, and output the result to the multiplying circuit 241. The multiplying circuit 241 is connected to the arithmetic operation unit 244 via the low-pass filter 243.

Since a scanning speed V of the scanning mirror 13 is constant and the rate of variation of $\Delta X$ is lower than the scanning speed V, the relationship of Xa–Xb=–t is established (where t=current time), and the values of variations IXa and IXb input to the multiplying circuit 241 are given by $$IXa = \cos\{4\pi(-Vt+\Delta X)\lambda\} \qquad (4)$$

$$IXb = \sin\{(4\pi(-Vt-\Delta X)\} \qquad (5)$$

The multiplying circuit 241 multiplies the input IXa and IXb and delivers the obtained value, i.e.

$$S = (-\tfrac{1}{2})\sin(4\pi Vt/\lambda) + (\tfrac{1}{2})\sin(4\pi\Delta X/\lambda) \qquad (6)$$

to the low-pass filter 243. The low-pass filter 243 removes a high-frequency component of the first term of formula (6), which varies in a sine curve at a shorter cycle than the second term of formula (6), and delivers the obtained value, i.e.

$$S = (\tfrac{1}{2})\sin(4\pi\Delta X/\lambda) \qquad (7)$$

to the arithmetic operation unit 244.

The arithmetic operation unit 244 calculates ΔX on the basis of formula (7), and calculates the angle θ of inclination of the scanning mirror with respect to the optical axis on the basis of the above formula of ΔX–hθ. In this case, the arithmetic operation unit 244 calculates AX on the basis of formula (7), and finds the angle Δ in the azimuth direction of the scanning mirror 13 on the basis of the value ΔX–hθ. At this time, the arithmetic operation unit 244 shifts the phase of the output IXb of the second laser beam detector 232 by 90° and multiplies the phase-shifted output IXb with the output IXa of the first laser beam detector 231. Thus, the angle θ of inclination is calculated. For example, when the angle θ of inclination is 0°, an output signal is 0°. Accordingly, the angle θ of inclination can be easily achieved with high precision.

In the angle calculating unit 24, the phase of output IXb of the second laser beam detector 232 is shifted by 90° by using the integrating circuit 242. However, a differentiating circuit, a delay line, etc. may be used to shift the phase of the output IXb or IXa by 90°, thereby similarly measuring the angle θ of inclination with high precision.

In the above-described angle detecting apparatus, the laser beam from the laser beam oscillator 21 is guided to the incident light path of the beam splitter 11 of the Michelson interferometer by means of the first guide mirror 20. The beam components made incident on the fixed mirror 12 and scanning mirror 13 are returned to the beam splitter 11, thus producing the interference beam. The interferometer laser beam is guided to the first and second laser beam detectors 231 and 232 by the second guide mirror 22 to detect variations in intensity of the interference laser beam. On the basis of the variations in intensity of the interference laser beam, the angle θ of inclination of the scanning mirror 13 is measured.

According to the present embodiment, the angle of inclination of the scanning mirror can be detected with high precision and high reliability with no need of providing a corner cube, unlike the prior art. The provision of such a corner cube results in an increase in apparatus size. This embodiment contributes to enhancement in precision of light spectrum measurement.

In addition, according to this embodiment, since high-precision measurement of the angle of inclination of the scanning mirror 13 is achieved, the precision of control of the angle of inclination of the scanning mirror itself can be improved.

Figure 4:
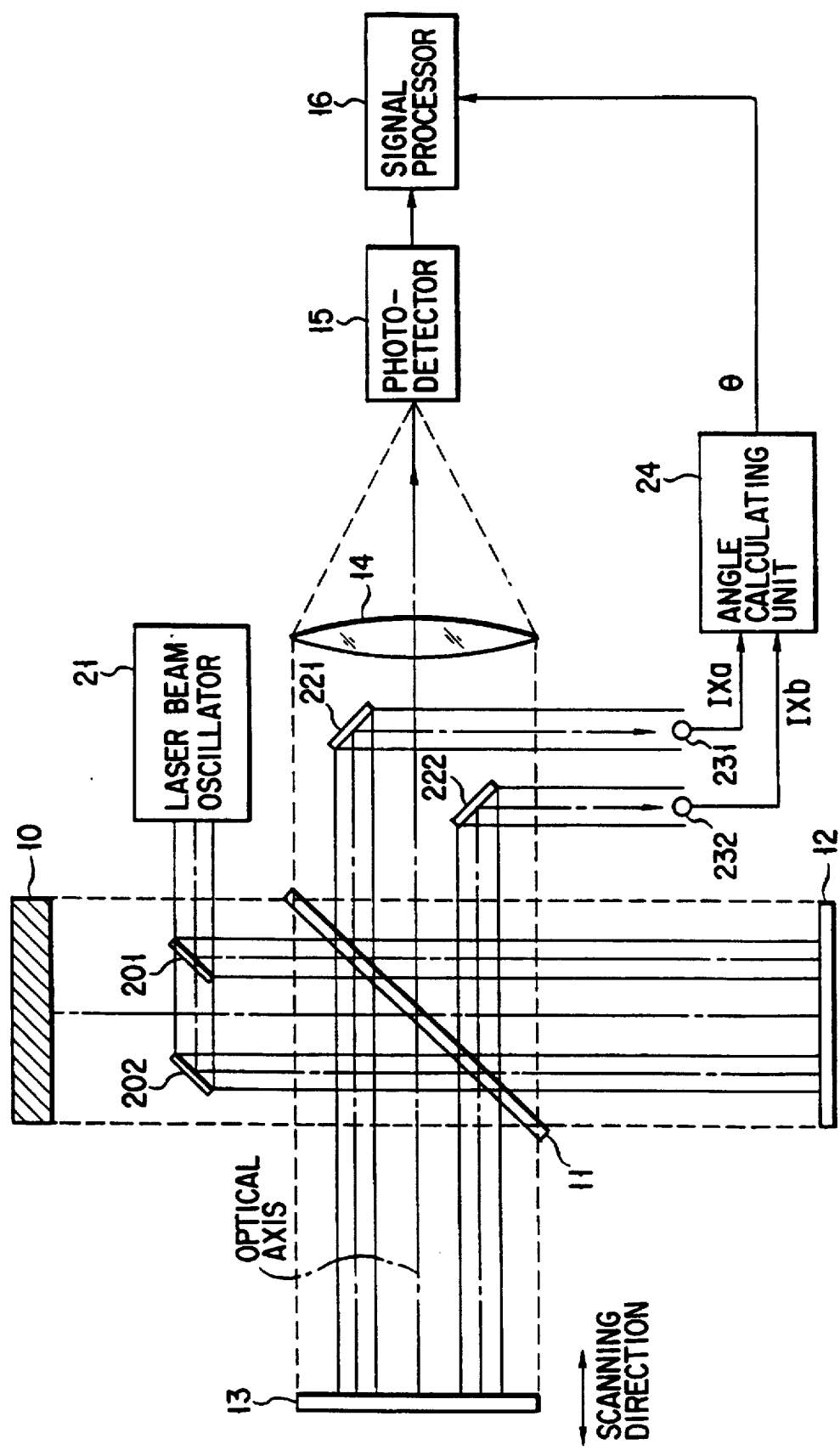
FIG. 4 shows schematically the structure of a part of another embodiment of the invention.

In the above embodiment, the laser beam from the laser beam oscillator 21 is guided to the first and second laser beam detectors 231 and 232 by means of the first and second guide mirrors 20 and 22. However, as is shown in FIG. 4, it is possible to separate the laser beam from the laser beam oscillator 21 and guide separated beam components to the first and second laser beam detectors 231 and 232. Specifically, two first guide mirrors 201 and 202 are provided on incident light paths of the beam splitter 11 associated with the laser beam oscillator 21 at a predetermined distance between the first guide mirrors 201 and 202. In addition, two second guide mirrors 221 and 222 are provided on emission light paths of the beam splitter 11 at a predetermined distance therebetween, thereby guiding laser beams to the first and second laser beam detectors 231 and 232.

The angle detecting apparatus according to the above embodiment is constructed so that the angle θ of inclination of the scanning mirror 13 in the azimuth direction can be detected. However, this angle detecting apparatus may be constructed so as to detect the angle of inclination of the scanning mirror 13 in the elevation direction. In this case, the first and second laser beam detectors 231 and 232 are juxtaposed in the elevation direction of the scanning mirror 13. The interference beam of the laser beam from the laser beam oscillator 21 is obtained through the beam splitter 11. The interference beam is observed by the first and second laser beam detectors 231 and 232, thereby detecting the angle of inclination of the scanning mirror 13 in the elevation direction.

In the above embodiment, by making use of the angle θ of inclination obtained by the angle calculating unit 24, the wavelength and light intensity of the radiation light from the observation object 10 measured by the Michelson interferometer are amended. However, by making use of the angle θ of inclination obtained by the angle calculating unit 24, the angle of the scanning mirror 13 may be controlled or various functions of the Michelson interferometer may be corrected.

In the above embodiment, the angle of inclination of the scanning mirror 13 in the azimuth direction or elevation direction is detected. However, the laser beam detector may be constructed, as is shown in FIGS. 5 to 7, so as to detect the angles of inclination in both the azimuth direction and elevation direction.

In FIG. 5, first to third laser beam detectors 301 to 303 are arranged at apices of a substantially right-angled triangle defined with respect to the optical axis of the beam splitter 11, thereby detecting the angles of inclination in both the azimuth direction and elevation direction. Specifically, the interference laser beam of the laser beam from the laser beam oscillator 21 is guided via the beam splitter 11 to the first to third laser beam detectors 301 to 303. Outputs A and B from the first and second laser beam detectors 301 and 302 are supplied to an azimuth angle calculating unit 31, and outputs B and C from the second and third laser beam detectors 302 and 303 are supplied to an elevation angle calculating unit 32.

The azimuth angle calculating unit 31 calculates the angle of inclination in the azimuth direction by finding variations IXa and IXb in intensity of the interference laser beam in the azimuth direction on the basis of the outputs A and B of the first and second laser beam detectors 301 and 302.

The elevation angle calculating unit 32 calculates the angle of inclination in the elevation direction by finding variations IYa and IYb in intensity of the interference laser beam in the elevation direction on the basis of the outputs B and C of the second and third laser beam detectors 302 and 303.

In FIG. 6, first to third laser beam detectors 401 to 403 are arranged at apices of an equilateral triangle defined with respect to the optical axis of the beam splitter 11, thereby detecting the angles of inclination in both the azimuth direction and elevation direction. Specifically, the interference laser beam of the laser beam from the laser beam oscillator 21 is guided via the beam splitter 11 to the first to third laser beam detectors 401 to 403. Output terminals of the first and second laser beam detectors 401 and 402 are connected to an azimuth angle calculating unit 41. The azimuth angle calculating unit 41 calculates the angle of inclination in the azimuth direction by finding variations IXa and IXb in intensity of the interference laser beam in the azimuth direction on the basis of outputs A and B of the first and second laser beam detectors 401 and 402.

The output terminals of the first and second laser beam detectors 401 and 402 are connected to an arithmetic operation unit 42. An output terminal of the arithmetic operation unit 42 is connected to one input terminal of an elevation angle calculating unit 43. On the basis of outputs A and B from the first and second laser beam detectors 401 and 402, the arithmetic operation unit 42 executes an operation of (A+B)/2. Thus, a variation Iyb in intensity of the interference laser beam is calculated and output to the elevation angle calculating unit 43. An output terminal of the third laser beam detector 403 is connected to the other input terminal of the elevation angle calculating unit 43. An output C from the third laser beam detector 403 is input to the elevation angle calculating unit 43. The elevation angle calculating unit 43 calculates the angle of inclination in the elevation direction by using the output C of the third laser beam detector 403 as a variation IYb in intensity of the interference laser beam in the elevation direction.

In FIG. 7, first to fourth laser beam detectors 501 to 504 are arranged at apices of a substantial parallelogram defined with respect to the optical axis of the beam splitter 11, thereby detecting the angles of inclination in both the azimuth direction and elevation direction. Specifically, the interference laser beam of the laser beam from the laser beam oscillator 21 is guided via the beam splitter 11 to the first to fourth laser beam detectors 501 to 504. Outputs A and B from the first and second laser beam detectors 501 and 502 are supplied to an azimuth angle calculating unit 51, and outputs C and D from the third and fourth laser beam detectors 503 and 504 are supplied to an elevation angle calculating unit 52. The azimuth angle calculating unit 51 calculates the angle of inclination in the azimuth direction by finding variations IXa and IXb in intensity of the interference laser beam in the azimuth direction on the basis of the outputs A and B of the first and second laser beam detectors 501 and 502.

The elevation angle calculating unit 52 calculates the angle of inclination in the elevation direction by finding variations IYa and IYb in intensity of the interference laser beam in the elevation direction on the basis of the outputs C and D of the third and fourth laser beam detectors 503 and 504.

The arithmetic operations of the angle of inclination in the elevation direction in FIGS. 5 to 7 are executed in substantially the same manner as the above-described arithmetic operations of the angle of inclination in the azimuth direction.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An angle detecting apparatus for detecting an angle of inclination of a scanning mirror of a Michelson interferometer, said apparatus comprising:

a fixed mirror situated on one of a transmission light path and a reflection light path of a beam splitter to which an incident light beam is guided;

a scanning mirror situated on the other of the transmission light path and the reflection light path of the beam splitter so as to be movable along an optical axis of the scanning mirror, said incident light beam being guided to the scanning mirror;

photodetector means for receiving an interference light beam emanating from said beam splitter, said incident light beam being guided via the beam splitter to the fixed mirror and the scanning mirror, reflected by the fixed mirror and the scanning mirror and returned to and interfered by the beam splitter, said photodetector means detecting a variation in intensity of the interference beam;

laser beam oscillation means for oscillating a laser beam;

optical means for guiding the laser beam from said laser beam oscillation means to the light paths of the beam splitter and receiving an interference laser beam from said beam splitter;

laser beam detector means for detecting variations in light intensity of the interference laser beam obtained by said optical means at at least two points in one of an azimuth direction and an elevation direction of the scanning mirror;

angle calculating means for calculating an angle of inclination of the scanning mirror in one of the azimuth direction and the elevation direction of the scanning mirror on the basis of the light intensities of said interference laser beam detected by said laser beam detector means at said at least two points; and signal processor means for arithmetically calculating a wavelength of said incident light beam on the basis of the variation in intensity of the interference beam which is detected by said photodetector means, and arithmetically adjusting the calculated wavelength of said incident light beam on the basis of the angle of inclination of the scanning mirror which is calculated by said angle calculating means.

2. The apparatus according to claim 1, wherein said laser beam detector means includes two detectors.

3. The apparatus according to claim 1, wherein said angle calculating means multiplies two outputs from the laser beam detector means representing the detected light intensities at said at least two points, with one of said two outputs being phase-shifted by 90°, removes a high-frequency portion from the multiplied result, and calculates the angle of inclination of the scanning mirror in one of the azimuth direction and the elevation direction on the basis of the wavelength of the laser beam from the laser beam oscillation means.

4. An angle detecting apparatus for detecting an angle of inclination of a scanning mirror of a Michelson interferometer, said apparatus comprising:

a fixed mirror situated on one of a transmission light path and a reflection light path of a beam splitter to which an incident light beam is guided;

a scanning mirror situated on the other of the transmission light path and the reflection light path of the beam splitter so as to be movable along an optical axis of the scanning mirror, said incident light beam being guided to the scanning mirror;

photodetector means for receiving an interference light beam emanating from said beam splitter, said interference light beam being produced such that said incident light beam is guided via the beam splitter to the fixed mirror and the scanning mirror, reflected by the fixed mirror and the scanning mirror and returned to and interfered by the beam splitter, said photodetector means detecting a variation in intensity of the interference beam;

laser beam oscillation means for oscillating a laser beam;

optical means for guiding the laser beam from said laser beam oscillation means to the light paths of the beam splitter and receiving an interference laser beam from said beam splitter;

laser beam detector means for detecting variations in light intensity of the interference laser beam obtained by said optical means at at least two points in each of an azimuth direction and an elevation direction of the scanning mirror;

angle calculating means for calculating an angle of inclination of the scanning mirror in each of the azimuth direction and the elevation direction of the scanning mirror on the basis of the light intensities of said interference laser beam detected by said laser beam detector means at said at least two points in each of the azimuth direction and the elevation direction; and signal processor means for arithmetically calculating a wavelength of said incident light beam on the basis of the variation in intensity of the interference beam which is detected by said photodetector means, and arithmetically adjusting the calculated wavelength of said incident light beam on the basis of the angle of inclination of the scanning mirror which is calculated by said angle calculating means.

5. The apparatus according to claim 4, wherein said laser beam detector means includes three detectors arranged at apices of a triangle.

6. The apparatus according to claim 4, wherein said laser beam detector means includes four detectors arranged at apices of a parallelogram.

7. The apparatus according to claim 4, wherein said angle calculating means multiplies two outputs from the laser beam detector means representing the detected light intensities at said at least two points in each of the azimuth direction and the elevation direction, with one of said two outputs being phase-shifted by 90°, removes a high-frequency portion from the multiplied result, and calculates the angle of inclination of the scanning mirror in each of the azimuth direction and the elevation direction on the basis of the wavelength of the laser beam from the laser beam oscillation means.

* * * * *